United States Patent [19]

Alley et al.

[11] Patent Number: 5,057,962
[45] Date of Patent: Oct. 15, 1991

[54] MICROPROCESSOR-BASED PROTECTIVE RELAY SYSTEM

[75] Inventors: Robert P. Alley, Clifton Park; William H. Bicknell, Ballston Lake, both of N.Y.

[73] Assignee: General Electric Company, Schenectady, N.Y.

[21] Appl. No.: 468,320

[22] Filed: Jan. 22, 1990

[51] Int. Cl.[5] ............................................. H02H 7/08
[52] U.S. Cl. ...................................... 361/24; 361/103; 318/783
[58] Field of Search .......................... 361/24, 25, 103; 364/483; 318/783

[56] References Cited

U.S. PATENT DOCUMENTS

| | | | |
|---|---|---|---|
| 3,683,237 | 8/1972 | Walstad et al. | 361/31 |
| 4,356,525 | 10/1982 | Kornrumpf et al. | 361/4 |
| 4,547,826 | 10/1985 | Premerlani | 361/25 |
| 4,764,744 | 8/1988 | Alley et al. | 336/131 |

OTHER PUBLICATIONS

Boothman, D. R. et al., "Thermal Tracking-A Rational Approach to Motor Protection", IEEE PES-Winter Meeting, New York, Jan. 27-Feb. 1, 1974, pp. 7-15.

Primary Examiner—Todd E. DeBoer
Attorney, Agent, or Firm—Jill M. Breedlove; James C. Davis, Jr.; Marvin Snyder

[57] ABSTRACT

A microprocessor-based relay system is used in combination with relay contactors and a control circuit therefor to protect an electric motor from overload currents in addition to phase faults, ground faults, load losses, and load jams. The microprocessor is provided with a data base comprising thermal characteristics of the motor during heating and cooling. The heating data comprise current versus time curves stored as a look-up table for which each data point represents a thermal limit, i.e., the maximum time the motor is permitted to operate at a particular current level. The cooling data comprise motor cooling rates. Phase currents are sampled at preselected fixed time intervals during a predetermined period thereof, and an average motor current value is calculated therefrom. A thermal sum, which is initialized at zero upon first starting the motor, is adjusted depending on the average motor current value relative to a predetermined overload current value. The average motor current value is used as an index to the heating curve look-up table. If the thermal sum exceeds the corresponding thermal limit in the look-up table for a predetermined time interval, then an overload condition is indicated, and the relay is tripped.

27 Claims, 8 Drawing Sheets

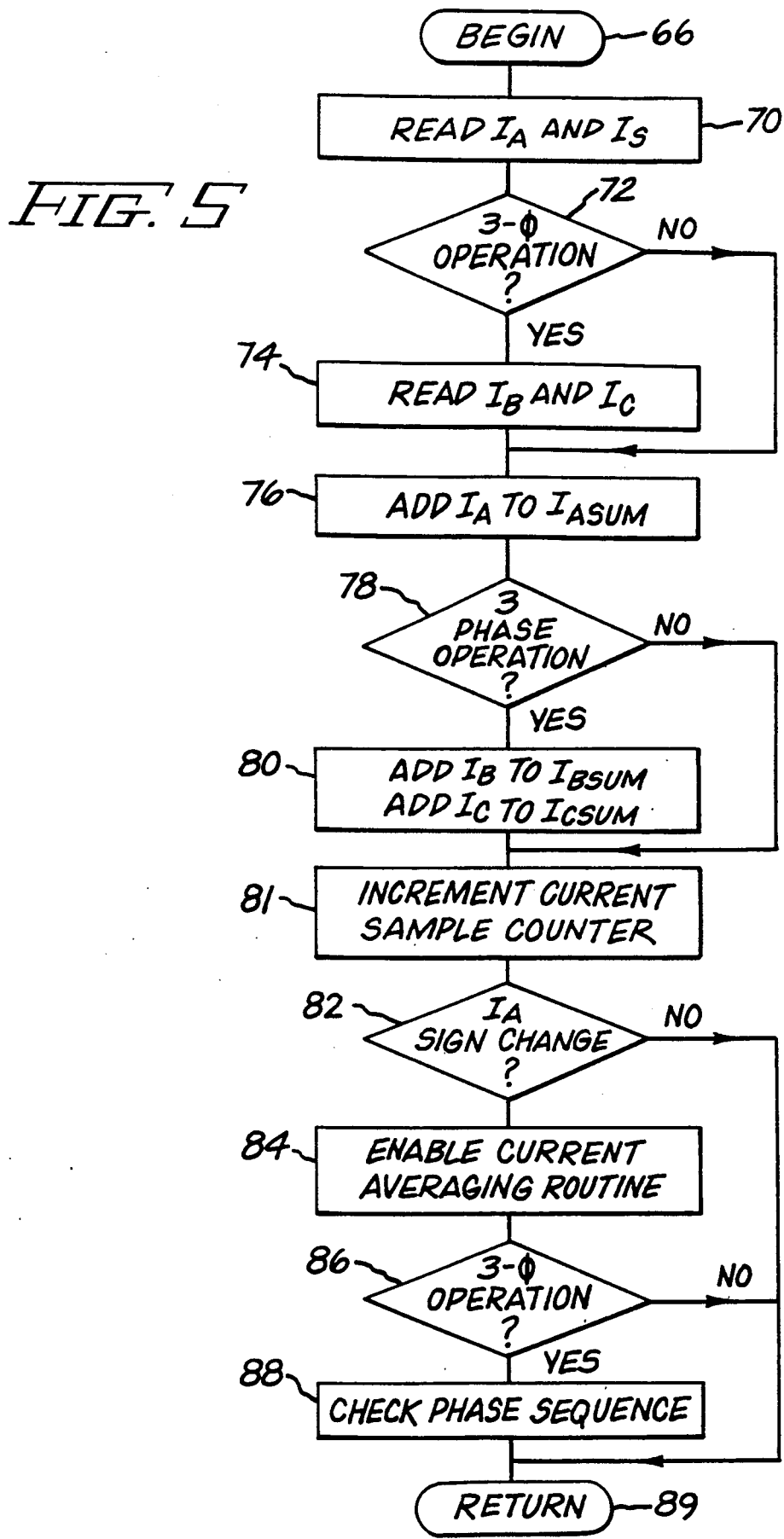

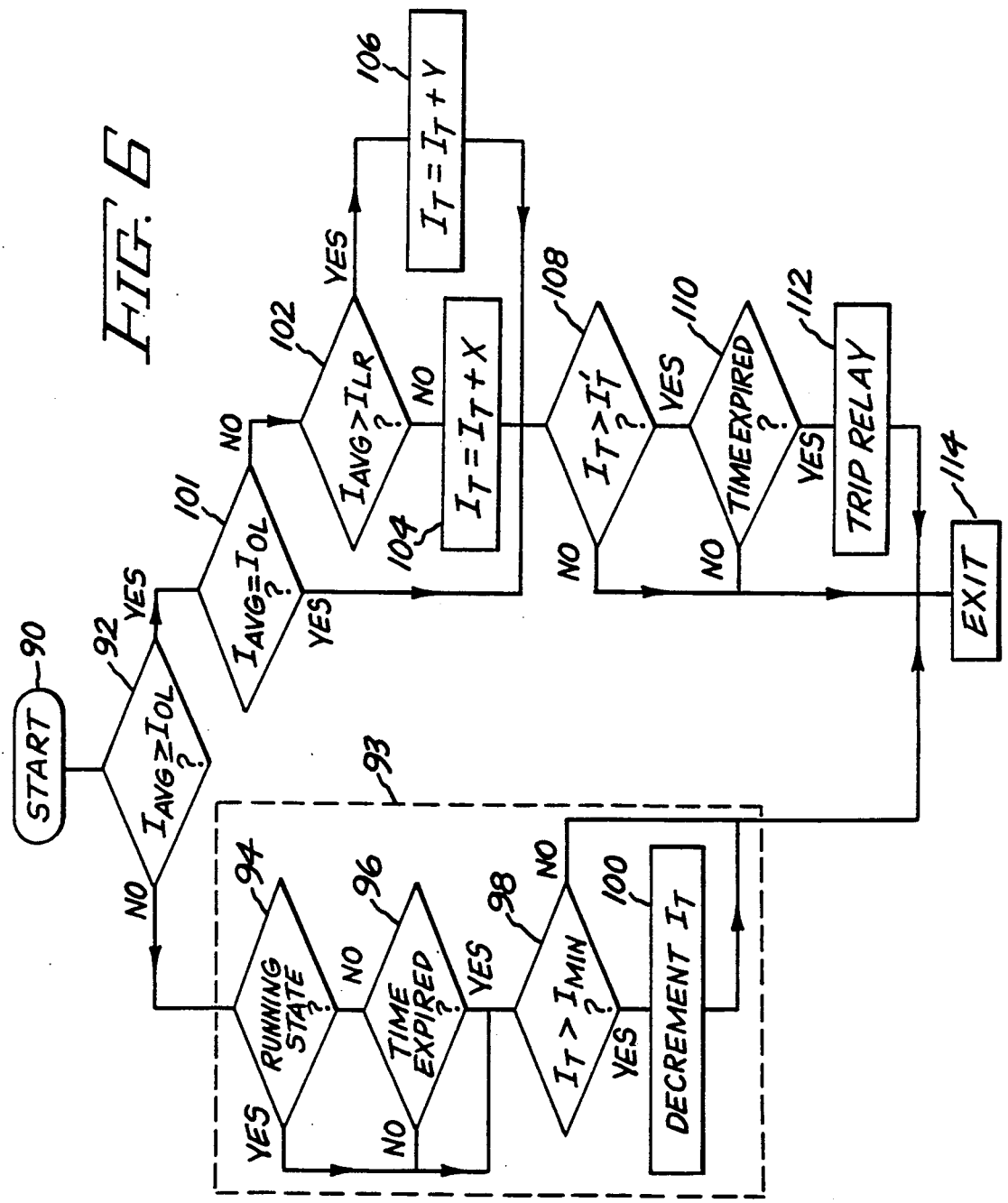

MICROPROCESSOR-BASED PROTECTIVE RELAY SYSTEM

FIELD OF THE INVENTION

The present invention relates generally to protective relays. More particularly, the present invention relates to a microprocessor-based relay system for protecting an electric motor.

BACKGROUND OF THE INVENTION

Conventional overload relays for protecting electric motors against excessive current are of the thermal type wherein a bimetal actuator is heated directly or indirectly as a function of motor current and operates to effect interruption of the motor circuit under overload conditions. In general, industrial motors are adequately protected by such bimetal relays. Disadvantageously, however, for applications in which high duty cycles are required or the load may vary widely, bimetal relays do not accurately represent the thermal characteristics of a motor, especially under transient conditions. Such a mismatch between the thermal characteristics of a motor and a relay may cause nuisance trips if the overload threshold is set too conservatively or, conversely, motor overheating if the threshold is set to avoid nuisance trips. Moreover, improvements in the motor industry which have resulted in a reduced weight-to-horsepower ratio have consequently resulted in higher motor operating temperatures, thereby reducing the overload capability of motors. It would be desirable to provide an overload relay which is not susceptible to the aforementioned deficiencies of conventional overload relays.

Accordingly, it is an object of the present invention to provide a relay system which is capable of accurately duplicating thermal characteristics of a motor, thereby adequately protecting the motor, even under transient conditions.

Another object of the present invention is to provide a relay system which is capable of maintaining the thermal history of a motor.

Another object of the present invention is to provide an overload relay system which is capable of protecting a motor from: phase faults, including phase sequence errors, phase unbalance, and phase losses; ground faults; load losses; and load jams.

Still another object of the present invention is to provide a microprocessor-based relay system including a data base for storing heating and cooling curves for a wide variety of motors.

Yet another object of the present invention is to provide a microprocessor-based relay system which operates in a start-up mode that allows for high inrush currents during starting transients without tripping the relay.

SUMMARY OF THE INVENTION

The foregoing and other objects of the present invention are achieved in a new and improved microprocessor-based relay system for protecting a single-phase or a multiphase electric motor. The main function of the relay system is to provide overload current protection. A preferred embodiment also provides protection from phase faults, ground faults, load losses, and load jams. To these ends, motor current is monitored, and a thermal history of the motor is maintained.

In accordance with a preferred embodiment of the present invention, a microprocessor is used in combination with relay contactors and a control circuit therefor to provide a protective relay system for a three-phase electric motor. Current sensing transformers, preferably of the type having an adjustable air gap, provide phase current feedback signals to a vector summing means for computing the vector sum of the phase current feedback signals. If the vector sum of the currents is not substantially equal to zero, i.e., is greater than a preselected percentage of the normal operating, or rated, current value, then a ground fault detector deactivates the contactors to prevent current from flowing to the motor, i.e., trips the relay.

The phase current feedback and vector sum signals are supplied to a microprocessor via an analog-to-digital converter. The microprocessor is provided with a data base comprising thermal characteristics of the motor during heating and cooling, i.e., a thermal model of the motor. Specifically, the heating data comprise current versus time curves for which each point represents the time limit for operation at a particular current level; these points are designated herein as thermal limits. Preferably, these heating data are stored as a look-up table in microprocessor memory. The cooling data comprise motor cooling rates derived from temperature versus time curves.

Phase currents are sampled at preselected fixed time intervals during a half cycle of one of the phase current feedback signals, and a phase current sum is maintained for each respective motor phase. A fixed sampling interval which is asynchronous for both 50 Hz and 60 Hz operation is used so that recurring half-cycle features of the phase current waveforms will be sensed. At the end of each half cycle, a phase current average is computed for each phase, and the phase current averages are added together and divided by three, for the three-phase case, for example, to provide an average motor current value. Furthermore, at the end of each half cycle, the phase sequence is checked for errors.

The average motor current value is used to determine a thermal sum which represents the thermal history of the motor, i.e. heating and/or cooling of the motor during the operation thereof. Initially, before first starting the motor, the thermal sum is set to zero. Thereafter, each computed value of average motor current is used to determine the amount by which the thermal sum is to be adjusted to reflect motor heating or cooling. In particular, if the average motor current is greater than a predetermined overload value, then the thermal sum is incremented at a specific rate determined by the percentage of the rated current at which the motor is operating. If the average motor current is equal to the overload value, then the thermal sum is held constant. On the other hand, if the average motor current is less than the overload value, then the thermal sum is decremented at a rate which also depends upon the percentage of the rated current at which the motor is operating. In this way, cooling of the motor after starting, or other condition causing short-duration heating of the motor, is taken into account, thereby avoiding nuisance tripping of the relay.

The average motor current value is also used as an index to the heating curve look-up table in order to obtain the corresponding thermal limit for comparison to the thermal sum. If the thermal sum is greater than the corresponding table value for a predetermined time interval, then an overload is indicated and the relay is tripped.

BRIEF DESCRIPTION OF THE DRAWINGS

The features and advantages of the present invention will become apparent from the following detailed description of the invention when read with the accompanying drawings in which:

FIG. 5 is a flowchart illustrating a method for determining average motor current according to a preferred embodiment of the present invention; and FIG. 6 is a flowchart illustrating a method for determining a thermal sum for detecting overload conditions according to a preferred embodiment of the present invention.

DETAILED DESCRIPTION OF THE INVENTION

Figure 1A:
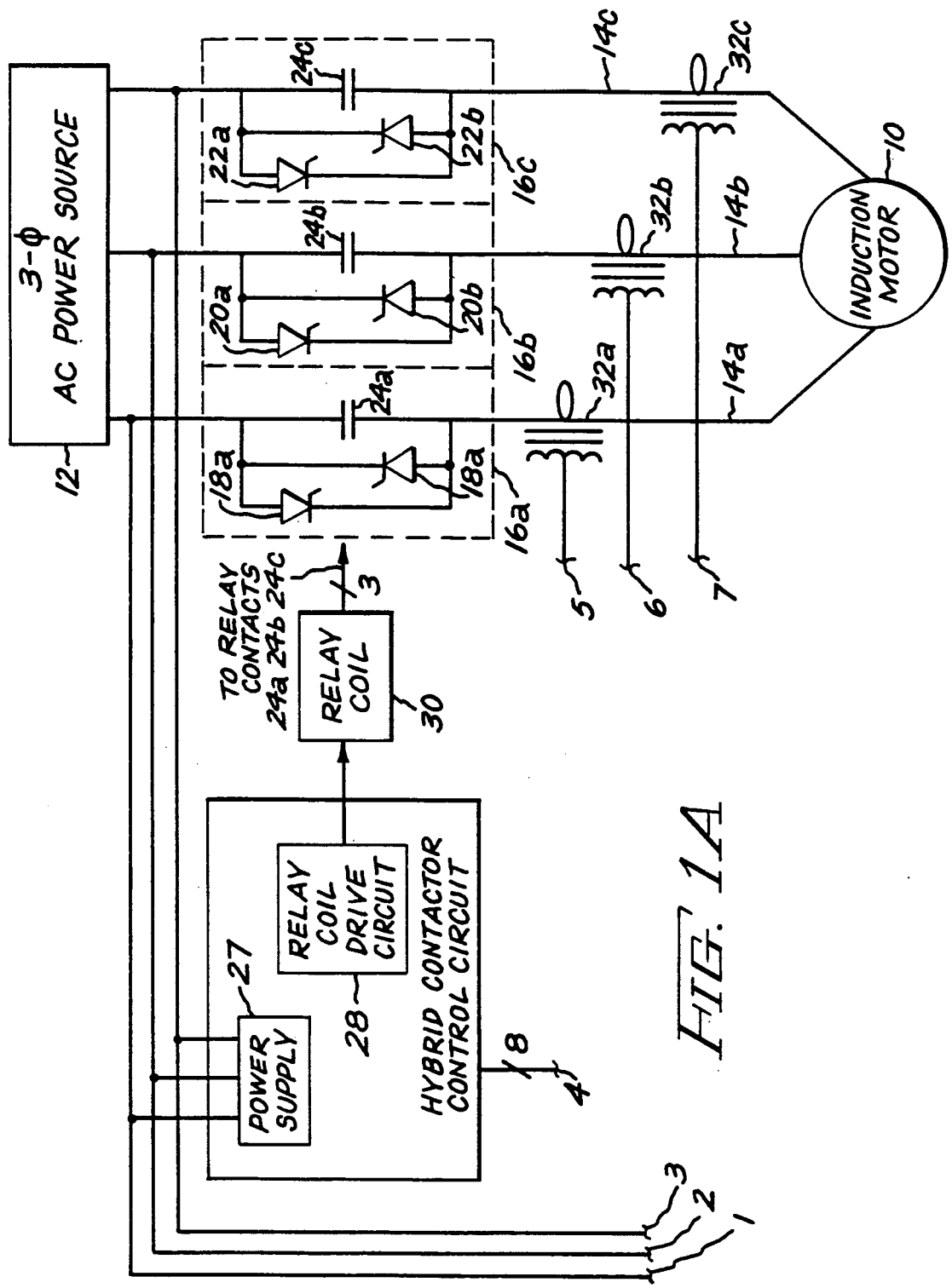
FIGS. 1A and 1B together comprise a block diagram of an induction motor employing a protective relay system according to a preferred embodiment of the present invention.
Figure 1B:
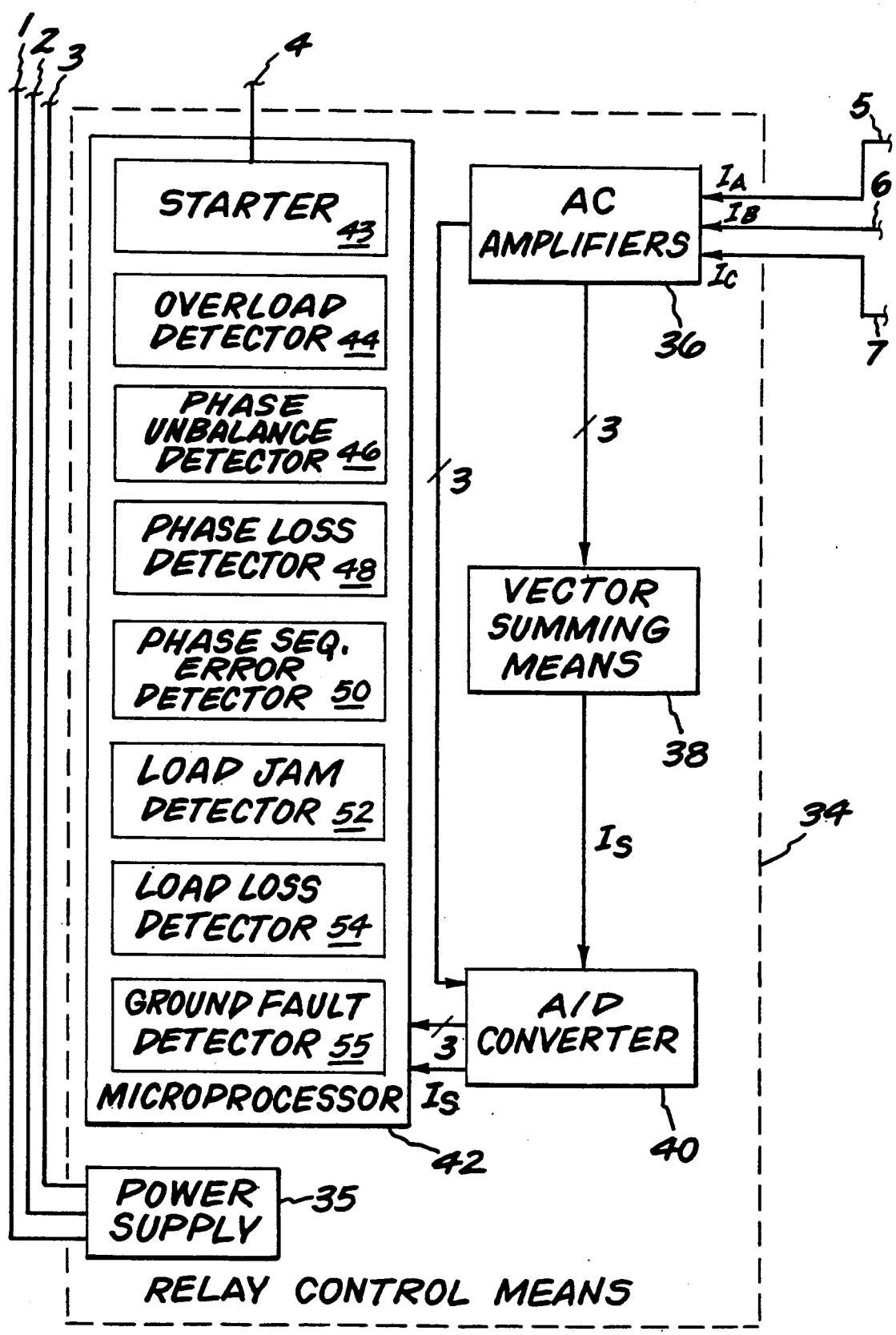

FIGS. 1A and 1B, connected at points 1–7, together comprise a block diagram of an induction motor 10 employing a protective relay system according to a preferred embodiment of the present invention. Although the illustrated machine is a three-phase induction motor, it is to be understood that the principles of the present invention apply equally well to other types of electric machines having any number of phases. An ac power source 12 provides electric power to the motor 10 and to the relay system via main conductors 14a, 14b, and 14c. The relay system includes switching means 16a, 16b, and 16c preferably comprising hybrid contactors having a pair of anti-parallel connected silicon controlled rectifiers (SCR's) 18a–18b, 20a–20b, and 22a–22b respectively connected in parallel relationship with a pair of relay contacts 24a, 24b, and 24c. The hybrid contactors, or switching means, control the current from the ac power source to the induction motor 10. In particular, each switching means is closed when either the corresponding relay contacts or the corresponding SCR's are turned on; and each switching means is open only when the corresponding relay contacts are open and the respective SCR's are turned off. Those of skill in the art will appreciate that although hybrid contactors are illustrated and described herein, any suitable type of relay contactor may be used.

The hybrid contactors 16a, 16b, and 16c are controlled by a hybrid contactor control circuit 26 including a power supply 27 and a relay coil drive circuit 28 for driving a relay coil 30 to provide turn-on and turn-off signals to the hybrid contactors. To turn on a respective hybrid contactor, relay coil drive circuit 28 provides current to relay coil 30 in order to initiate closure of the corresponding relay contacts. On the other hand, to turn off a respective hybrid contactor, relay coil drive circuit 28 causes the respective pair of relay contacts to open before the SCR's are switched to their high impedance state, i.e. turned off, in order to avoid arcing across the contacts. A suitable hybrid contactor control circuit is described in commonly assigned U.S. Pat. No. 4,356,525 issued to W. P. Kornrumpf and J. L. Ciccone on Oct., 26, 1982, which patent is hereby incorporated by reference.

Current sensing transformers 32a, 32b, and 32c are coupled to main conductors 16a, 16b, and 16c, respectively, for sensing instantaneous phase currents therethrough and providing Current feedback signals $I_A$, $I_B$, and $I_C$ respectively representative thereof. In accordance with the present invention, samples of the sensed current feedback signals are taken at fixed intervals in an asynchronous mode for both 50 and 60 Hz operation so that recurring features in the phase current waveforms may be detected. Preferably, current sensing transformers 32a, 32b, and 32c have adjustable air gaps for calibrating the relay to operate at a current rating within a range determined by the degree of adjustability allowed by the particular transformers being used. In particular, each transformer is calibrated so that 100% of rated current corresponds to a predetermined voltage level. Such current transformers having adjustable air gaps are described in commonly assigned U.S. Pat. No. 4,764,744 issued to R. P. Alley and F. G. Turnbull on Aug. 16, 1988, which patent is hereby incorporated by reference. Advantageously, since transformers of this type produce signals proportional to frequency, and since current sampling in accordance with the present invention is performed in an asynchronous mode for both 50 and 60 Hz operation, no relay calibration is needed to account for a change in operating frequency between 50 and 60 Hz.

The current feedback signals $I_A$, $I_B$, and $I_C$ are supplied to a relay control means 34 including a power supply 35. More specifically, the current feedback signals are supplied to ac amplifiers 36 which act as signal conditioners and buffers in addition to providing error scaling of the signals applied thereto. The output signals from the ac amplifiers 36 corresponding to the phase current feedback signals $I_A$, $I_B$, and $I_C$, respectively, are added together vectorially by a vector summing means 38 to produce a vector sum signal $I_S$. A suitable vector summing means may comprise an analog network which may be constructed in a variety of ways, as is well-known in the art. The resultant vector sum signal $I_S$ and the amplified current feedback signals $I_A$, $I_B$, and $I_C$ are provided to a microprocessor 42 via an analog-to-digital (A/D) converter 40. In an alternative embodiment (not shown), A/D converter 40 is part of the microprocessor 42. Furthermore, in a preferred embodiment of the present invention, microprocessor 42 comprises: a starter 43, an overload detector 44, a phase unbalance detector 46, a phase loss detector 48, a phase sequence error detector 50, a load jam detector 52, a load loss detector 54, and a ground fault detector 55. It is to be understood that although a microprocessor is used in the preferred embodiment of the present invention, the functions performed by the microprocessor may be performed using hardware or an integrated circuit as well.

Figure 2:
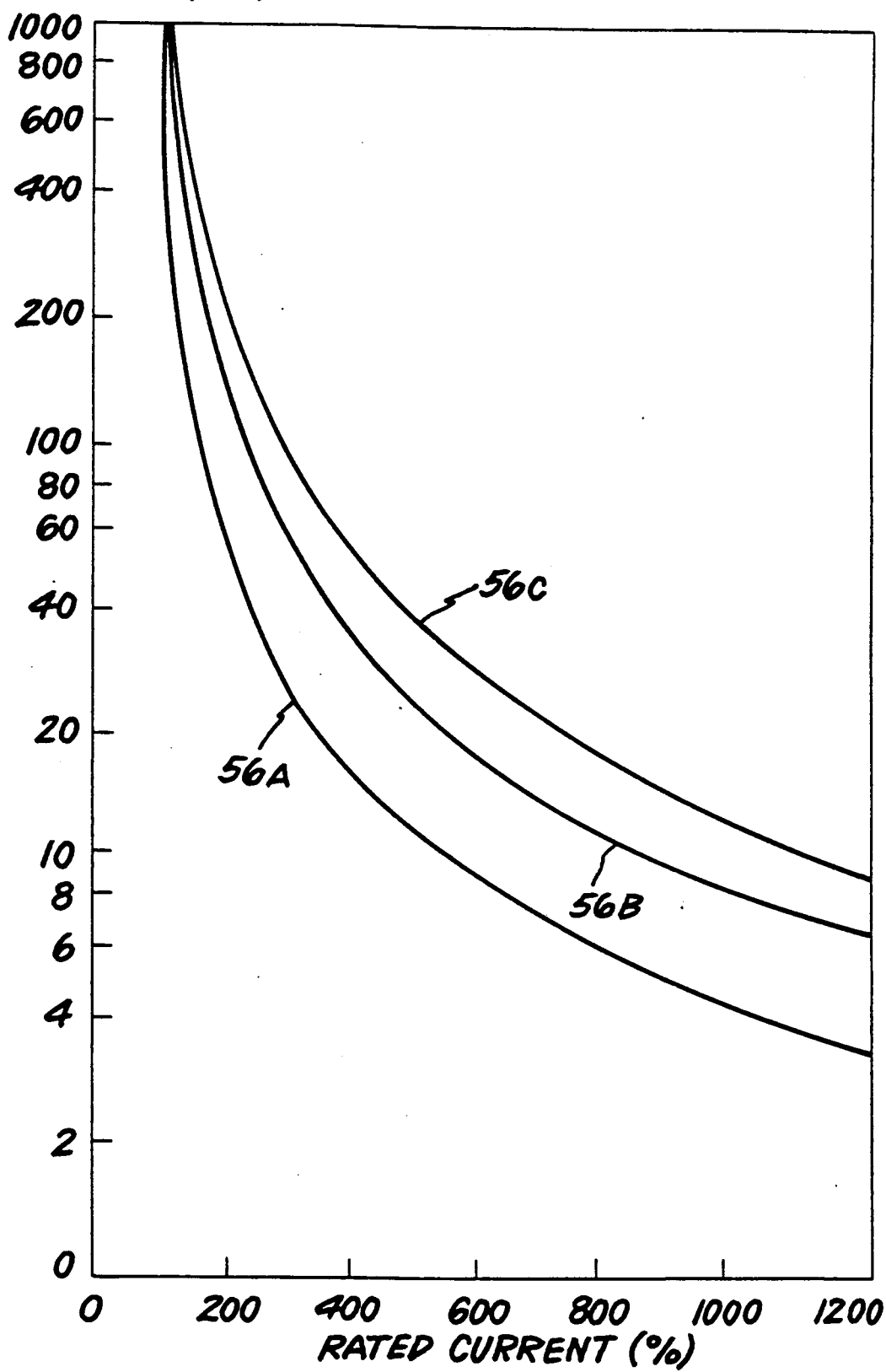
FIG. 2 is a graphical illustration of heating curves representing current versus time data for Class 10, Class 20, and Class 30 induction motors.

In accordance with a preferred embodiment of the present invention, microprocessor 42 is provided with a data base which contains a thermal model of different types of electric motors, including, of course, that of induction motor 10. Specifically, the data are derived from heating and cooling curves for different types of motors. FIG. 2 illustrates heating curves 56a, 56b, and 56c for Class 10, Class 20, and Class 30 motors, respectively. The heating curves of FIG. 2 are current versus time curves on which each point represents the time limit for operation at a particular current level before tripping the relay; these points are designated herein as thermal limits. Preferably, the heating curves are stored in the microprocessor memory as a look-up table.

Figure 3A:
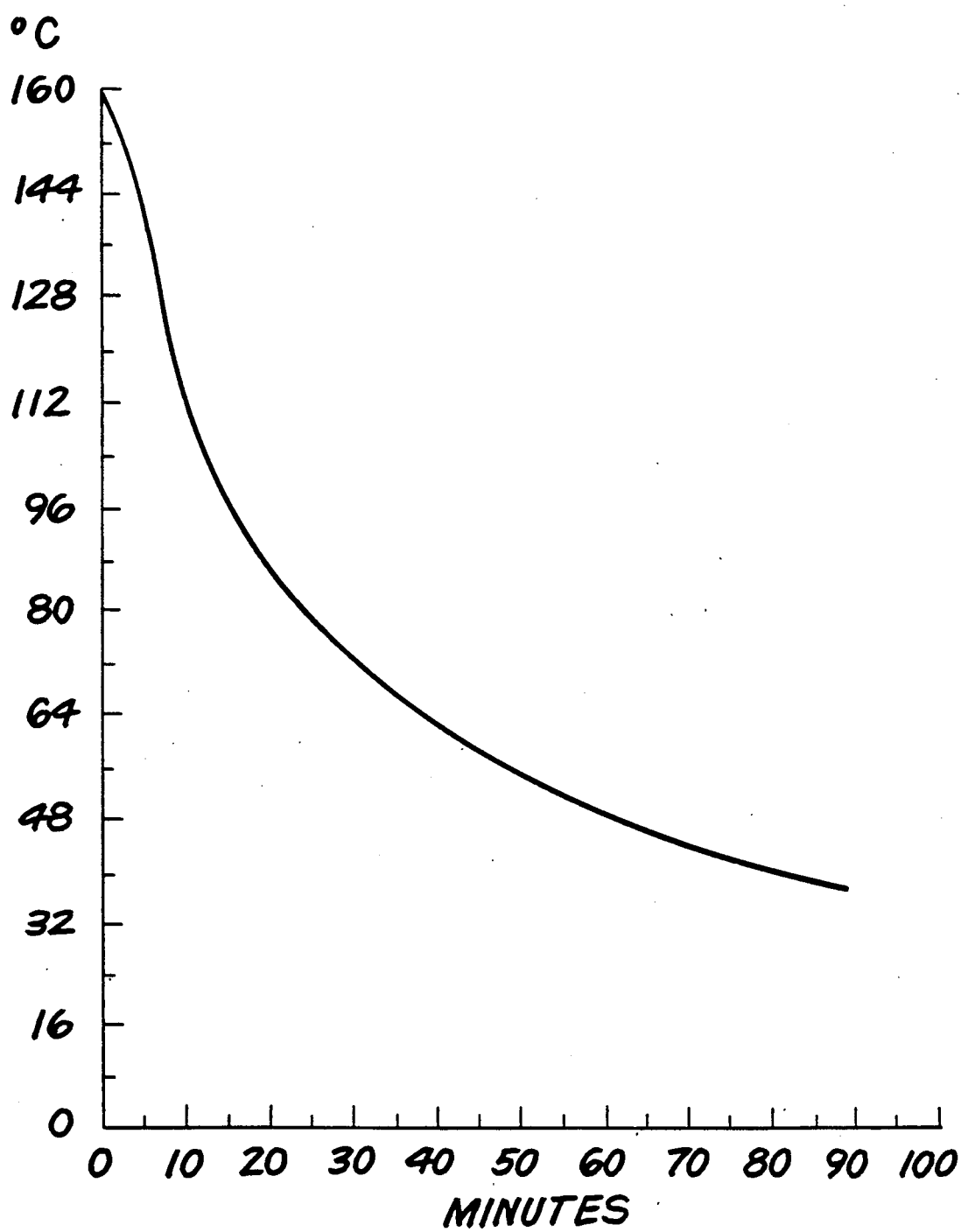
FIGS. 3A and 3B are cooling curves representing temperature versus time data for a 3 horsepower induction motor and a 40 horsepower induction motor, respectively.
Figure 3B:
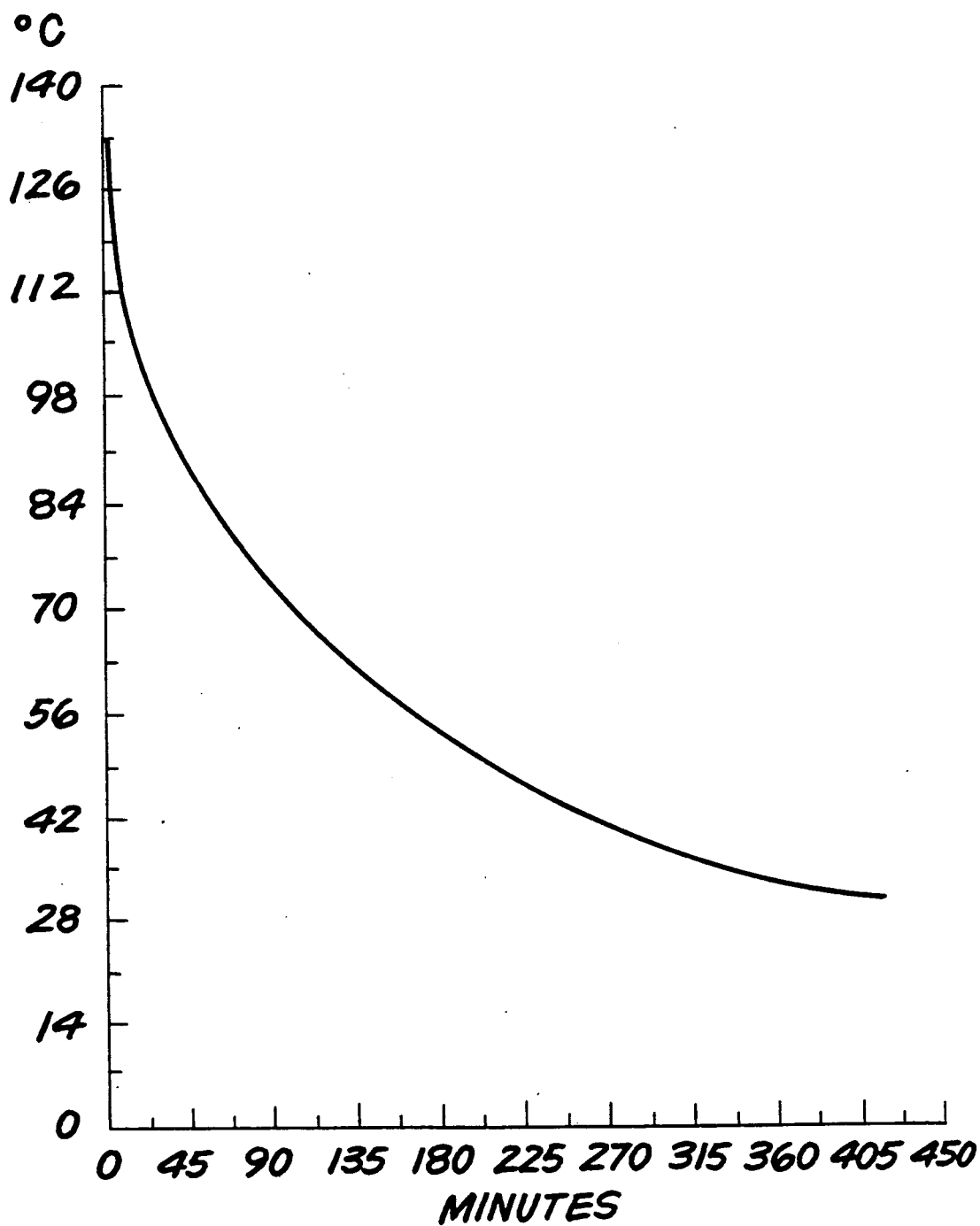

FIGS. 3A and 3B respectively illustrate typical cooling curves 58 and 59, for 3 horsepower (hp) and 40 hp induction motors, respectively, which are useful for approximating the cooling characteristics of Class 10, 20, and 30 motors as a function of time over a wide range of currents, i.e., approximately 3 to 90 amperes (A). In particular, for an initial cooling period, the rate of cooling is approximately the same for both the 3 hp and 40 hp motors; only the duration of the initial cooling period varies. After the initial cooling period, the cooling rate varies, depending on the type of motor.

Figure 4:
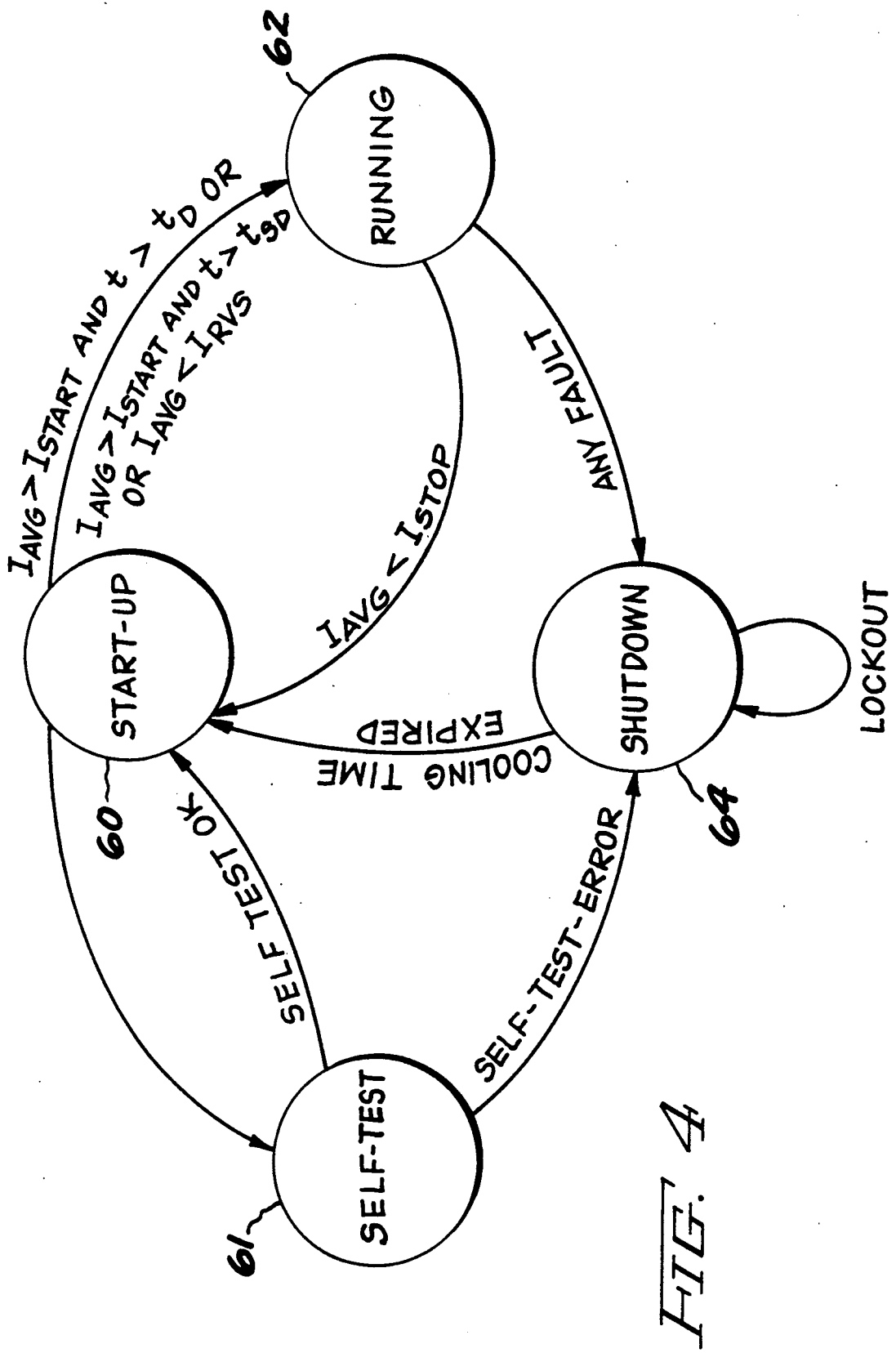
FIG. 4 is a state diagram of a preferred embodiment of the relay system of the present invention.

FIG. 4 is a state diagram for the relay system of the present invention. According to a preferred embodiment, as illustrated, a transition from a start-up state 60 to a self-test state 61 is made during motor starting. The primary function of the self-test is to ensure that the A/D converter reference voltages for the current feedback signals $I_A$, $I_B$, and $I_C$ are substantially equal. If they are not substantially equal, then a self-test error is indicated, and a transition will be made to a shutdown state 64; otherwise, operation will continue in the start-up state. Other functions of the self-test may include, for example, checking timers and counters.

As shown in FIG. 4, there are three alternative conditions for making a transition from a start-up state 60 to a running state 62. These three conditions correspond to three alternative starting modes of starter 43 of FIG. 1: (1) a normal starting mode; (2) a start window mode; and (3) a reduced voltage starting mode. A suitable starting mode depends on the particular motor and the application therefor and is chosen before initially starting the motor. In the normal starting mode, when the average motor current $I_{AVG}$ is greater than a threshold current $I_{START}$ (e.g. 25% of normal operating, or rated, current) for a fixed time to, e.g. 0.25 seconds, then a transition to the running state 62 is made. In the start window mode, operation will transition to the running state 62 when the average motor current $I_{AVG}$ is greater than the threshold Current $I_{START}$ for a variable time delay $t_{SD}$ selected by the operator before initially starting the motor. According to a preferred embodiment, a start delay look-up table is stored in microprocessor 42 (FIG. 1A). Finally, the reduced voltage starting mode is particularly suitable for applications in which a step-down transformer is used to reduce the source voltage during start-up in order to decrease inrush currents. The transition requirement for the reduced voltage starting mode is that the average motor current $I_{AVG}$ fall below a reduced voltage start threshold $I_{RVS}$, e.g. 250% of rated current, after the initial starting current surge. In any of the three starting modes, tripping the relay due to high inrush currents upon starting will be avoided.

In the running state, the relay system operates to detect fault conditions which necessitate transition to the shutdown state 64, i.e., tripping of the relay. In a preferred embodiment, such faults include: overloading; ground faults; load losses; load jams; and phase faults, including phase sequence errors, phase losses, and phase unbalance. Furthermore, in the running state, a transition back to the starting state 60 is made whenever the average motor current $I_{AVG}$ is less than a second current threshold $I_{STOP}$.

In the shutdown state 64, a counter is preferably employed to count the number of trips caused by overloading. According to a preferred embodiment, if the number of overload trips is less than a predetermined number, e.g. 4, then the system will automatically transition back to the starting state after the time period determined by the appropriate cooling curve is satisfied, while maintaining the thermal sum of the motor in microprocessor memory. Exemplary cooling times for Class 10, 20, and 30 motors, respectively, are 1, 2, and 3 minutes, respectively. On the other hand, if the number of trips caused by overloading exceeds the predetermined number, a lockout condition is indicated. As a result, the microprocessor will prevent restarting of the motor until power to the relay system is manually removed to clear relay memory, thereby resetting the thermal sum to zero.

FIG. 5 is a flowchart illustrating a preferred method by which microprocessor 42 calculates the average motor current $I_{AVG}$. The program begins with step 66, and at step 70, the microprocessor reads the vector sum signal $I_s$ and a phase current feedback signal for one phase, e.g. $I_A$, provided by the A/D converter. A test is made at step 72 to determine whether motor operation is single-phase or three-phase. If operation is three-phase, then the microprocessor reads the phase current feedback signals corresponding to phases B and C at step 74. Each phase A current reading is added to previous Phase A current readings in step 76, thereby providing a phase A current sum $I_{ASUM}$. Similarly, if the three-phase operation test at step 78 is positive, then phase current sums $I_{BSUM}$ and $I_{CSUM}$ are likewise computed for phases B and C, respectively, at step 80. A current sample counter is incremented at step 81 each time a new phase A current sample is added to $I_{ASUM}$. In particular, each phase current sample is taken at a fixed time interval which is asyncnhronous to both 50 and 60 Hz operation, for the reasons described hereinabove.

At step 82, a test is made to determine whether the sign of the phase A current feedback signal has changed, thus determining the end of a half cycle. At this point, at step 84 of the program, a motor current averaging routine is enabled for calculating the average motor Current $I_{AVG}$ over the half cycle. First, this routine involves computing a phase current average for each phase $I_{AAVG}$, $I_{BAVG}$, and $I_{CAVG}$, respectively, by dividing each phase current sum $I_{ASUM}$, $I_{BSUM}$, and $I_{CSUM}$, respectively, by the number of phase A current samples taken. Next, the average motor current $I_{AVG}$ is computed by adding the phase current averages together and dividing by three, i.e. for the three-phase case.

After the average motor current $I_{AVG}$ is determined, another three-phase operation test is made at step 86, after which, if the test is positive, phase sequence error detector 50 (see FIG. 1) is enabled at step 88. In accordance with a preferred embodiment, phase error detector 50 performs an EXCLUSIVE-OR function with the previous sign of the phase A current feedback signal and the present sign of phase B current feedback signal. If the signs are equal, a phase sequence error is indicated by the phase sequence error detector 50, and the relay is tripped. The microprocessor returns to the main program at step 89.

FIG. 6 is a flowchart illustrating a preferred method by which microprocessor 42 calculates a thermal sum $I_T$ and compares it with the corresponding thermal limit of the thermal model of the motor for determining whether an overload current condition exists. The thermal sum represents the thermal history of the motor, i.e. heating and/or cooling of the motor during the operation thereof. In particular, the thermal sum $I_T$, which is initially set to zero before start-up, is adjusted to reflect changes in motor temperature during operation of the motor. The thermal sum routine of FIG. 6 starts with step 90, and step 92 involves a comparison of the average motor current $I_{AVG}$ with a predetermined current overload value $I_{OL}$, e.g. 110% of the rated current.

If the average motor current $I_{AVG}$ is less than the overload value $I_{OL}$, then a cool down routine (shown in dashed lines 93) is enabled to reduce the value of the thermal sum $I_T$. The cool down routine begins with step 94 in which a test is made to determine the state of the system. For operation in either the start-up state or the shutdown state, the routine proceeds to step 96 in which an appropriate timer is checked. In the start-up state, this step comprises determining whether the initial time delay, $t_D$ or $t_{SD}$, has passed before transitioning to the running state, as described hereinabove. However, in the shutdown state, there are two cooling periods, as described hereinabove. Although the initial cooling rate is approximated to be the same for all motors within the current range of the system, the duration of the initial period depends on the type of motor. The test in step 96 determines when the initial cooling period has expired. Then, another test is made at step 98 to determine whether the thermal sum $I_T$ has been decremented to a predetermined minimum value $I_{MIN}$; if so, the thermal sum will not be decremented further; if not, the thermal sum will be decremented at step 100 at a fixed rate which depends upon the cooling characteristics of the particular motor in accordance with thermal model of the motor, as described hereinabove. In the running state, if the thermal sum $I_T$ is greater than the predetermined minimum value $I_{MIN}$, then the thermal sum $I_T$ is decremented in the same manner in step 100 to reflect motor fan cooling.

If the average motor current $I_{AVG}$ equals the overload value $I_{OL}$, as determined by a test 101, then no adjustment is made to the thermal sum $I_T$. However, if the average motor current $I_{AVG}$ is greater than the overload value $I_{OL}$, then another test is preferably made at step 102 whereby it is determined whether the average motor current $I_{AVG}$ exceeds a predetermined locked rotor value $I_{LR}$, e.g. 400% of rated current. If not, the thermal sum $I_T$ is incremented at step 104 at a fixed rate X. If, however, this test is positive, then the thermal sum $I_T$ is incremented at an even higher rate Y at step 106 to reflect the expected increased heating rate in case of a locked rotor condition.

Step 108 involves comparing the thermal sum $I_T$ with the corresponding look-up table value $I_T'$, i.e. the corresponding thermal limit. The average motor Current $I_{AVG}$ comprises the index to the look-up table. If the thermal sum $I_T$ exceeds the corresponding look-up table value $I_T'$ for a predetermined time interval, as determined by a test 110, then the relay is tripped by the overload detector 44 (FIG. 1B) at step 112. Step 114 is the exit from the thermal sum adjustment routine. A transition back to the start-up state then may be made; if so, the motor transitions to the running state when the aforesaid starting conditions are subsequently satisfied.

A preferred embodiment of the present invention also comprises phase fault detecting means including means for detecting: phase unbalance; phase losses; and phase sequence errors, as described hereinabove. The phase unbalance detector 46 (FIG. 1B) according to a preferred embodiment compares the phase A current average $I_{AAVG}$ with the average motor current $I_{AVG}$. Similarly, the phase B current average $I_{BAVG}$ is compared with the average motor Current $I_{AVG}$. If both phase current averages are not substantially equal to a predetermined percentage of the average motor current $I_{AVG}$, then a phase unbalance is indicated, and if the condition persists for a specified period of time, then the relay will be tripped. If deemed desirable, the phase C current average $I_{CAVG}$ may likewise be compared with the average motor current $I_{AVG}$.

Phase loss detector 48 (FIG. 1B) compares the average motor current $I_{AVG}$ and the phase current average of any phase with the rated current. If the average motor current $I_{AVG}$ is greater than a predetermined percentage of the rated current value, e.g. 25%, and any phase current average is below a second, but lower percentage of the rated current value, e.g. 17%, then a phase loss is indicated; and, if the condition persists for a predetermined time interval, then the relay will be tripped by the microprocessor.

Load jam detector 52 (FIG. 1B) according to a preferred embodiment monitors the average motor current $I_{AVG}$ to determine whether it has increased to a predetermined load jam level. In particular, if the motor is operating properly, but there is a problem with the load which causes the motor current to increase to the load jam level, and this condition persists for a specified time interval, then a load jam is indicated, and the relay will be tripped by the microprocessor. A load jam may be caused, for example, by a mechanical failure.

As shown in FIG. 1, a preferred embodiment of the present relay system also comprises load loss detector 54 which monitors the average motor current $I_{AVG}$ to determine whether the motor current level has decreased to a predetermined load loss level. A decrease in motor current to the load loss level is generally caused by a loss of load coupling means which reduces the drive capability of the motor. If such a condition persists for a specified time interval, then a load loss is indicated, and the relay will be tripped by the microprocessor.

For a three-phase motor, the ground fault detector 55 activates the hybrid contactor control circuit 26 to trip the relay whenever the vector sum signal $I_S$, which represents the vector sum of the phase current feedback signals, is not substantially equal to zero (i.e., exceeds a predetermined percentage of the rated current value) for a predetermined time interval.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In an electric motor system having at least one phase and a main conductor connecting each phase of an electric motor to an ac power source, a protective relay system comprising:

a plurality of current sensing means for sensing currents through the main conductors, each respective one of said current sensing means providing a separate respective phase current feedback signal representative of current through the corresponding main conductor;

switching means coupled to each said current sensing means for controlling flow of current through said main conductors to said motor; and overload sensing means for detecting any overload condition of said motor and turning off said switching means to prevent flow of current through said main conductors if an overload condition occurs, said overload sensing means comprising:

(a) means for averaging each respective phase current feedback signal over a predetermined time interval to provide separate respective phase current averages corresponding thereto;

(b) means for computing an average motor current from said phase current averages;

(c) means for calculating a thermal sum corresponding to said average motor current, said thermal sum being initially set to zero before starting said motor, said thermal sum being increased at a predetermined heating rate as long as said average motor current is greater than a predetermined overload current value, and said thermal sum being decreased at a predetermined cooling rate as long as said average motor current is less than said predetermined overload value; and (d) means for comparing said thermal sum with a thermal limit determined by a thermal model of said motor and indicating an overload condition if said thermal sum exceeds the corresponding thermal limit for a predetermined time interval.

2. The protective relay system of claim 1 wherein said motor has three phases and said relay system further comprises:

ground fault sensing means including means for computing the vector sum of said phase current feedback signals and turning off said switching means to prevent flow of currents through said main conductors to said motor when said vector sum is not substantially equal to zero.

3. The protective relay system of claim 1 wherein said overload sensing means comprises a microprocessor.

4. The protective relay system of claim 1 wherein said thermal model comprises a look-up table containing current versus time data stored in memory in said microprocessor.

5. The protective relay system of claim 4 wherein said look-up table includes an index comprised of said average motor table.

6. The protective relay system of claim 1 further comprising starting means for making a transition from a start-up state to a running state when said average motor current exceeds a threshold starting current for a predetermined starting time interval.

7. The protective relay system of claim 1 further comprising starting means for making a transition from a start-up state to a running state when said average motor current decreases below a surge current threshold.

8. The protective relay system of claim 1 wherein said means for averaging each respective phase current feedback signal includes digital means for sampling each respective phase current feedback signal at preselected, substantially constant time intervals, said sampling being performed at a frequency which is asynchronous with the frequency of operation of said motor.

9. The protective relay system of claim 1 wherein said switching means comprises a hybrid contactor associated with each respective phase of said motor and having a pair of relay contacts in parallel with an associated semiconductor switching unit including at least one semiconductor switch, said relay system further comprising a relay coil drive circuit for controlling said contactors.

10. The protective relay system of claim 9 wherein each said semiconductor switching unit comprises a pair of silicon controlled rectifiers connected in antiparallel relationship.

11. The protective relay system of claim 1 wherein said current sensing means comprises a current sensing transformer coupled to each said main conductor.

12. The protective relay system of claim 11 wherein each said current sensing transformer includes an adjustable air gap therein.

13. The protective relay system of claim 1 further comprising:

lockout means for preventing application of power to said motor until said thermal sum is reset to zero if an overload condition has been indicated by said overload sensing means a predetermined number of times and for automatically resetting said switching means after a predetermined time if an overload condition has been indicated less than said predetermined number of times.

14. The protective relay system of claim 1 wherein said motor has at least two phases and said relay system further comprises:

means for detecting a phase unbalance in said motor including means for comparing at least two of the respective phase current averages to said average motor current and for turning off said switching means to prevent current from flowing through said main conductors to said motor if the respective phase current averages are not each substantially equal to a predetermined percentage of said average motor current for a second predetermined time interval.

15. The protective relay system of claim 1 further comprising means for detecting loss of current in a motor phase including:

means for comparing each respective phase current average to a preselected operating current value and for turning off said switching means to prevent current from flowing through said main conductors to said motor if any of said phase current averages is less than a predetermined percentage of said operating current value.

16. The protective relay system of claim 1 wherein said motor has at least two phases operating in a predetermined sequence and said relay system further comprises means for detecting a phase sequence error.

17. The protective relay system of claim 16 wherein said means for detecting a phase sequence error comprises means for comparing the sign of one phase of said motor with the sign of the previous phase of said motor in said predetermined sequence and for turning off said switching means to prevent current from flowing through said main conductors to said motor if said signs are not equal.

18. The protective relay system of claim 1 further including means for detecting a load jam comprising:

means for comparing said average motor current to a preselected operating current value and for turning off said switching means to prevent current from flowing through said main conductors to said motor if said average motor current exceeds a predetermined percentage of said operating current value.

19. The protective relay system of claim 1, further including means for detecting a load loss comprising:
means for comparing said average motor current to a preselected operating current value and for activating said switching means to prevent current from flowing through said main conductors to said motor if said average motor current is less than a predetermined percentage of said operating current value.

20. In an electric motor system, a method for protecting an electric motor from thermal overloading with the aid of a general purpose microprocessor, said motor having at least one phase and a main conductor connecting each phase of said motor to an ac power source, the steps of said method comprising:
providing said microprocessor with a data base comprising a thermal model of said motor and including a heating curve comprising current versus time data, each data point on said heating curve representing a thermal limit of operation of said motor;
sensing currents through said main conductors and providing a separate respective phase current feedback signal representative of current through the corresponding main conductor;
averaging each respective phase current feedback signal over a predetermined period thereof to provide separate respective phase current averages corresponding thereto;
computing an average motor current from said phase current averages;
calculating a thermal sum corresponding to said average motor current, said thermal sum being initially set to zero before starting said motor, said thermal sum being increased at a predetermined heating rate as long as said average motor current is greater than a predetermined overload current value, and said thermal sum being decreased at a predetermined cooling rate as long as said average motor current is less than said predetermined overload value;
comparing said thermal sum with the corresponding thermal limit curve and preventing flow of current through said main conductors to said motor if said thermal sum exceeds the corresponding thermal limit for a predetermined time interval.

21. The method of claim 20 wherein said motor has three phases and said method further comprises the step of:
computing the vector sum of said phase current feedback signals and preventing flow of current through said main conductors to said motor when said vector sum is not substantially equal to zero.

22. The method of claim 20 wherein said motor has at least two phases and said method further comprises the steps of:
detecting a phase unbalance in said motor by comparing at least two of the respective phase current averages to said average motor current; and
preventing flow of current through said main conductors to said motor if the respective phase current averages are not each substantially equal to a predetermined percentage of said average motor current for a second predetermined time interval.

23. The method of claim 20 wherein said motor has at least two phases and said method further comprises the steps of:
detecting loss of current in a motor phase by comparing each respective phase current average to a preselected operating current value; and
preventing flow of current through said main conductors to said motor if any of said phase current averages is less than a predetermined percentage of said operating current value.

24. The method of claim 20 wherein said motor has at least two phases operating in a predetermined sequence and said relay system further comprises the step of detecting a phase sequence error.

25. The method of claim 24 wherein the step of detecting a phase sequence error comprises:
comparing the sign of one phase of said motor with the sign of the previous phase of said motor in said predetermined sequence and preventing flow of current through said main conductors to said motor if said signs are not equal 26. The method of claim 20 further comprising the steps of:
detecting a load jam by comparing said average motor current to a preselected operating current value; and
preventing flow of current through said main conductors to said motor if said average motor current exceeds a predetermined percentage of said operating current value.

27. The method of claim 20 further comprising the steps of:
detecting a load loss by comparing said average motor current to a preselected operating current value; and
preventing flow of current through said main conductors to said motor if said average motor current is less than a predetermined percentage of said operating current value.

* * * * *